March 17, 1936.　　　J. S. EDWARDS　　　2,034,674
DUMPING VEHICLE
Filed Feb. 6, 1935　　　3 Sheets-Sheet 1

INVENTOR.
John S. Edwards
BY
ATTORNEY.

March 17, 1936. J. S. EDWARDS 2,034,674
DUMPING VEHICLE
Filed Feb. 6, 1935 3 Sheets-Sheet 2
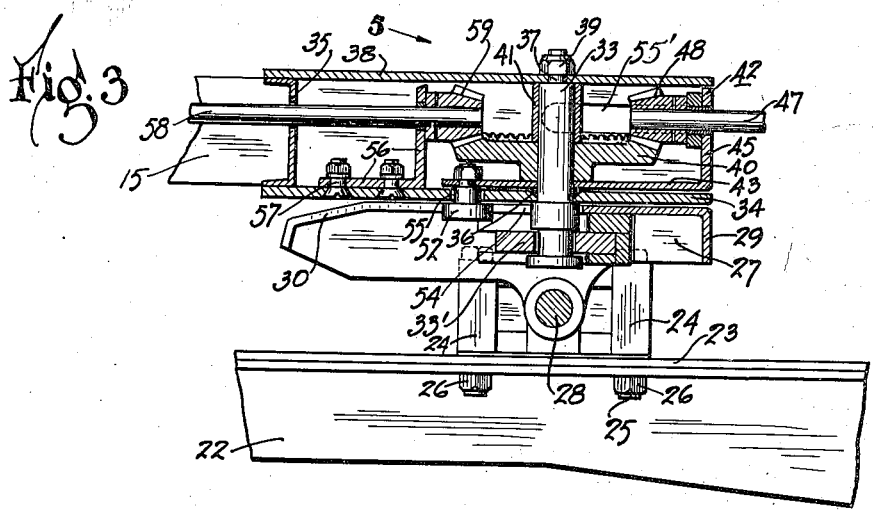
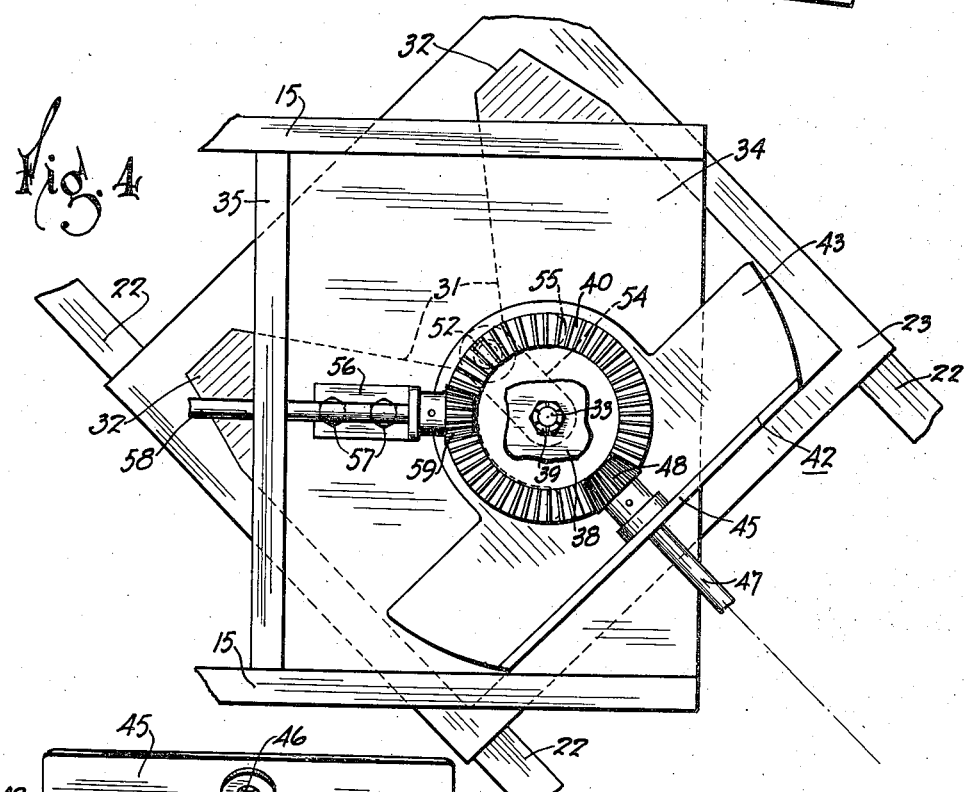
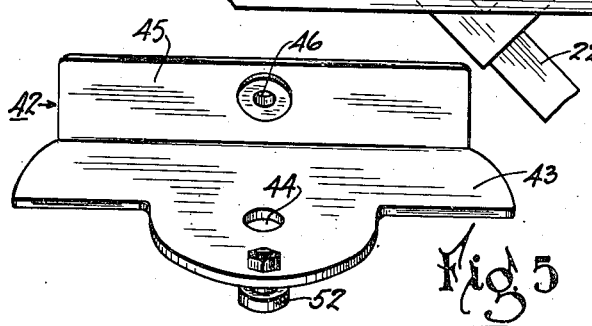
INVENTOR.
John S. Edwards
BY P. W. Pomeroy
ATTORNEY.

March 17, 1936.  J. S. EDWARDS  2,034,674
DUMPING VEHICLE
Filed Feb. 6, 1935  3 Sheets-Sheet 3

INVENTOR.
John S. Edwards
BY
ATTORNEY.

Patented Mar. 17, 1936

2,034,674

UNITED STATES PATENT OFFICE 2,034,674

DUMPING VEHICLE

John S. Edwards, South Bend, Ind., assignor to Edwards Iron Works, Incorporated, South Bend, Ind., a corporation of Indiana Application February 6, 1935, Serial No. 5,174

12 Claims. (Cl. 180—14)

This invention relates generally to a truck and semi-trailer combination in which the semi-trailer is provided with a dumping body and a hoist therefor, and mechanical driving means for operating the hoist from the power plant of the truck.

One of the primary objects of the present invention is the provision of hoist operating means of the kind referred to which includes the transmission of power from the truck motor to the dumping body through means supported by the semi-trailer above the fifth wheel forming the swivel connection between the truck and semi-trailer.

Another object is to provide transmission of power to the hoist referred to through a train of gears supported by the semi-trailer, one gear being rotatable about a vertical axis, another gear having its longitudinal axis parallel with the longitudinal axis of the semi-trailer, and another gear having its longitudinal axis parallel with the longitudinal axis of the truck irrespective of the alignment of the longitudinal axes of the truck and semi-trailer.

Another object is to provide a driving mechanism for the hoist referred to which comprises a gear rotatable about the king pin forming a part of the connection between the semi-trailer and truck, a driving gear meshing with the first gear supported by the semi-trailer adapted to rotate bodily relative thereto, and another gear meshing with the first gear fixed against bodily rotation relative to the semi-trailer.

A further object is to provide a driving mechanism for a hoist for raising a dumping body mounted on a semi-trailer supported by a truck which includes a gear operatively connected with the power source which is supported by the semi-trailer but which is maintained in axial alignment with the truck irrespective of the alignment with the longitudinal axes of the truck and semi-trailer.

A still further object is to provide a driving mechanism for a hoist for raising a dumping body mounted on a semi-trailer supported by a truck which includes a gear operatively connected with the power source supported by a member pivotally mounted on the semi-trailer which has means projecting therefrom engageable with the fifth wheel forming the swivel connection between the truck and semi-trailer to maintain the gear in axial alignment with the truck irrespective of whether the semi-trailer and truck are in axial alignment.

Other objects, and objects relating to details of construction, methods of operation and details of manufacture will be apparent from the drawings and the detailed description to follow.

In the drawings,

Fig. 3 is a detailed sectional view taken on the line 3—3 of Fig. 2.

Fig. 4 is a view similar to Fig. 2, showing the truck and semi-trailer out of axial alignment.

Fig. 5 is a perspective view looking substantially in the direction of the arrow 5, showing the driving gear supporting member illustrated in the preceding views.

Heretofore it has been the common practice to provide means for raising dumping bodies on trailers or semi-trailers, which equipment included flexible hose or tubes forming the coupling connection which easily got out of order, thus resulting in considerable loss of time to the operator and necessitating considerable expense in keeping such equipment in repair. Furthermore, the cost of installing such hydraulically operated means was very expensive and I have been enabled by my invention to materially reduce the installation cost and also provide a means for transmission of power which does not readily get out of order and which cuts the repair bills to a minimum.

In order that others may better understand my invention, reference will be had to the accompanying drawings in which like numerals refer to like parts throughout the several views and which with the detailed description to follow, will make clear to those skilled in the art one embodiment of my invention.

It will be understood that the drawings are for the purpose of illustration only and not as limiting the scope of the invention as it will be apparent that detailed changes can be made without departing from the principles which are herewith disclosed and described.

Figure 1:
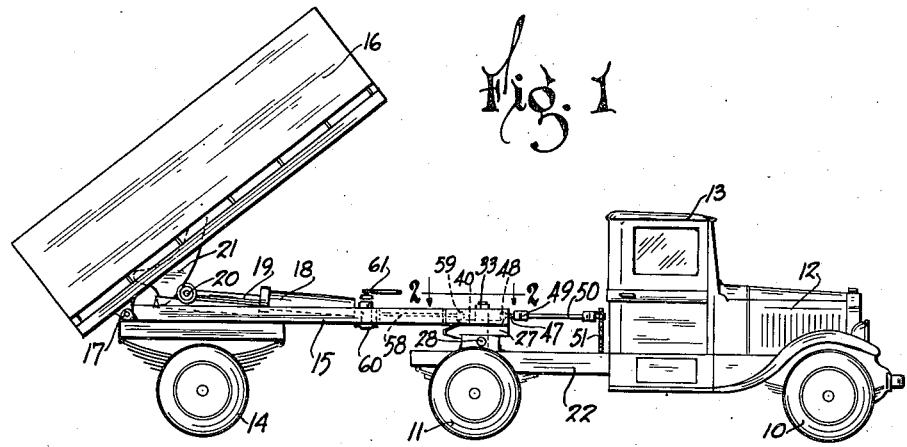
Fig. 1 is a side elevational view of a truck and a semi-trailer mounted thereon, showing my invention incorporated therein.
Figure 2:
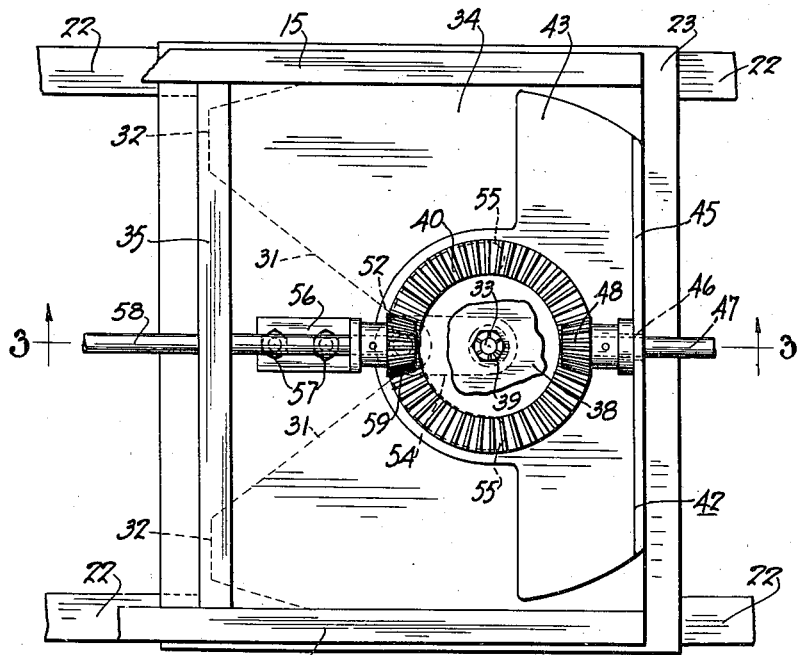
Fig. 2 is an enlarged fragmentary detailed plan view, showing the driving means for the hoist carried by the semi-trailer, looking in the direction of the arrows 2—2 of Fig. 1.

The invention as illustrated may be used in connection with a truck having front steering wheels 10 and rear wheels 11 driven in any suitable manner by a motor or other power plant housed beneath the hood 12 at the rear of which is mounted the driver's cab 13. A semi-trailer arranged to be drawn by the truck has the usual load supporting wheels 14 mounted beneath the frame 15 at the rear end thereof on which is mounted a dumping body 16 pivotally attached at 17 to the frame 15. The body 16 is arranged to be raised and lowered by a hoist 18 which may include a piston 19 to which is rotatably attached the roller 20 adapted to engage with the cam 21 supported by the frame of the dump body 16. It is evident that when the body 16 is lowered from the position shown in Fig. 1, the piston 19 may be moved rearwardly or outwardly from the hoist 18 so that the roller 20 thereon will engage with the cam 21 and the body 16 will move upwardly on its pivot 17 to the position shown in Fig. 1 in order that the load can be dumped therefrom. As the hoist 18 and the method of transmitting power therefrom to raise and lower the dump body 16 form no part of my invention except in combination with the means for transmitting power to the hoist, a further detailed description of the same is not thought necessary.

Figure 6:
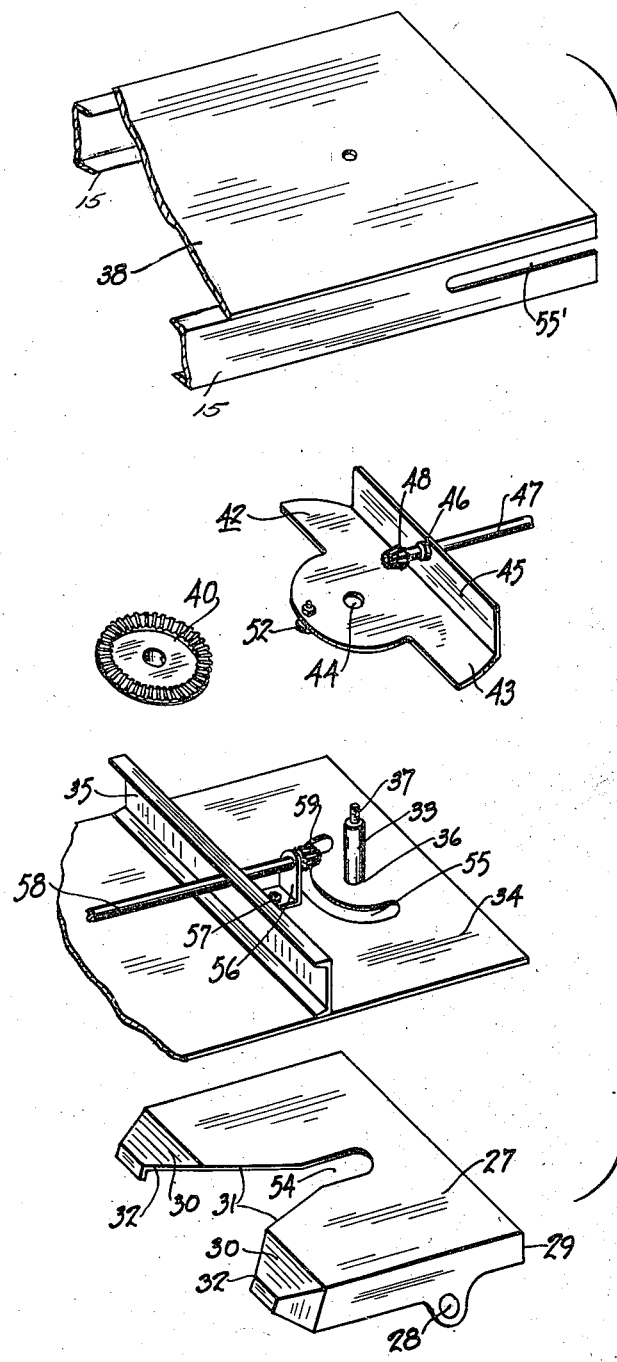
Fig. 6 is an illustration in perspective showing in separated relation the mechanism shown in Fig. 3 comprising, a trailer top plate, the driving gear supporting member, the trailer bottom plate with a king pin therein and a driven shaft supported thereby, and the fifth wheel, the locking mechanism therefor being omitted.

The truck frame 22 which is usually formed of spaced channel irons has a fifth wheel mounted thereon which may be like that shown in my Patent No. 1,922,359, issued August 15, 1933; however, the invention is not to be limited to the details of construction shown in that patent as the driving mechanism may be used in connection with any of several designs of fifth wheels now being commercially used. A plate 23 is mounted on the frame members 22 of the truck on which is secured a support 24 and which has bolts 25 extending therethrough secured to the plate 23 and frame members 22 by the nuts 26. The support 24 provides a bearing for the fifth wheel 27 which is pivotally supported thereon at 28. The fifth wheel 27 has downturned edges 29 along its front and sides, the rear face thereof being sloped downwardly at 30 for a purpose to be hereinafter described. The fifth wheel 27 is recessed at 31 to form a pair of outwardly facing jaws 32 to receive a king pin 33, in the manner described in my Patent No. 1,922,359 referred to above. The king pin 33 is latched in operative position by the latch member 33' carried by the fifth wheel 27, as described in the above patent. I have not shown the releasing means for the latch member because the same forms no part of the present invention and any of the several releasing means may be employed which are now used commercially. The king pin 33 is supported by the semi-trailer frame as shown in Figs. 3 and 6, and extends through a plate 34 which is secured to the bottom faces of the frame members 15 and the cross frame member 35. The king pin 33 is preferably welded at 36 to the plate 34 to be rigidly supported thereby. The upper end of the king pin 33 is reduced at 37 and extends through an opening in a cover or top plate 38 secured to the top faces of the frame members 15 and the frame cross member 35. A nut 39 on the reduced end 37 of the king pin 33 locks the same against movement relative to the cover plate 38 and also provides one of the securing means for the latter. The king pin 33 provides a journal for a beveled gear 40 which is free to rotate thereon and which is maintained in position by a sleeve 41 surrounding the king pin 33 extending between the top face of the beveled gear 40 and the bottom face of the cover plate 38.

An L-shaped member 42 having its bottom flange 43 interposed between the bottom cover plate 34 and the beveled gear 40 has an opening 44 therethrough through which the king pin 33 is inserted so that the member 42 pivots about the said king pin for a purpose to be hereinafter described. The vertical flange 45 of the member 42 has an opening 46 therethrough to receive the shaft 47 on which is mounted a beveled gear pinion 48 meshing with the beveled gear 40. The shaft 47 is provided with a coupling member 49 connecting the same with a driving shaft 50 which is preferably driven by the truck motor or power plant in any suitable manner as by sprocket chain 51. I, therefore, provide a direct drive for the beveled gear pinion 48 directly from the truck power plant and provide a suitable clutch (not shown) in the driving train as it is not desirable to drive the beveled gear pinion 48 at all times during the operation of the engine but only at such times as it is desired to raise the dumping body to unloading position. By using the construction just described, it will be seen that the beveled gear pinion 48 and the shaft 47 are supported by the trailer but as the longitudinal axis of the shaft 47 must be coincident with the longitudinal axis of the truck, the member 42 is permitted to pivot on the king pin 33 so as to permit the beveled gear pinion 48 to rotate bodily relative to the beveled gear 40 when it is desired to turn the truck relative to the trailer as, for example, when the respective vehicles set in the position as illustrated in Fig. 4. In other words, I am enabled to provide the driving connection between the truck and trailer even though the longitudinal axes of the respective vehicles are not in alignment. A pin or roller 52 is carried by the bottom flange 43 of the member 42 to engage with the jaws 32 of the fifth wheel 27 when the tractor is backed under the trailer so that when the king pin 33 enters the slot 54 of the fifth wheel 27 to lock-engaging position, the pin 52 will guide the member 42 and with it the shaft 47 and beveled pinion 48 to a position which will cause the longitudinal axis of the shaft 47 to coincide with the longitudinal axis of the truck whereupon the shaft 47 will be in alignment with the shaft 50 in order that the shafts may be coupled together to provide the driving connection heretofore described.

The cover plate 34 is provided with an arcuate slot 55 therein formed on a radius extending from the axis of the king pin 33 through which the shank of the roller 52 projects to thus permit swinging of the member 42 relative to the semi-trailer, the slot 55 preferably extending through a sufficient arc to permit the truck to move to a position in which the longitudinal axes of the trailer and truck are substantially perpendicular. As the roller 52 seats in the slot 54 in the fifth wheel 27 and as it is secured to the bottom flange of the member 42, the member 42 is caused to swing with the fifth wheel 27 and the truck relative to the trailer, when the truck is moved out of axial alignment with the trailer, and the shaft 47 and beveled gear 48 thereon and also maintained in axial alignment with the truck. Thus it will be seen that the truck can stand at right angles to the trailer to thus permit all the maneuvering in backing up and parking of the vehicles which is necessary or desirable in the easy and efficient manner of operating such vehicles. As the frame side members 15 of the trailer extend forwardly of the king pin 33 which forms the pivotal connection between the truck and trailer they are each provided with a slot 55' in the forward end thereof to permit the shaft 47 to be moved to the position so that its longitudinal axis is perpendicular to the longitudinal axis of the trailer and the beveled gear pinion 48 can rotate on the beveled gear 40 and at the same time provide a driving connection therewith.

As the shafts 47 and 50 are always in axial alignment when coupled together or when the king pin 33 is locked in position in the fifth wheel 27, it will be evident that I provide a means for transmission of power through the beveled gear 40 at all times even though the respective vehicles are parked in a position so that their longitudinal axes are substantially perpendicular to each other, or if the vehicles are in alignment, or in any intermediate position without in any way interfering with the driving mechanism. An L-shaped bracket 56 secured to the plate 34 by the bolts 57 forms a support for a driven shaft 58 on which a beveled gear pinion 59 is mounted at its forward end to mesh with the beveled gear 40, the rear end of the shaft being operatively connected with a pump 60 in advance of the hoist 18 for supplying power thereto to move the pistons 19 outwardly or into engagement with the cam 21 to raise the dump body 16 from horizontal to dumping position.

From the foregoing description it will be seen that I have provided a mechanism for the transmission of power from the truck motor or power plant to the pump for operating a hoist which comprises a beveled gear rotatable about the king pin 33 which is driven by a beveled gear pinion 48 supported by the trailer but which has its driving shaft in axial alignment with the longitudinal axis of the truck at all times during the driving operation while the driven beveled gear pinion 59 and the driven shaft 58 which are also supported by the trailer are always in axial alignment with the longitudinal axis of the trailer.

When the truck is disconnected from the trailer and it is desired to connect the vehicles, the truck is backed under the trailer whereupon the king pin 33 will enter between the jaws 32 of the fifth wheel and will move into the slot 54 to be engaged by the latch member 33' to be locked therein. During this rearward movement of the truck relative to the trailer, the pin 52 will also enter between the jaws 32 of the fifth wheel 27 and will move the member 42 therewith to a position so that the shaft 47 carried thereby will line up with the truck or extend parallel with the longitudinal axis thereof and the same can be coupled with the shaft 50 at 49 to thus complete the driving connection. Having connected the shafts 47 and 50 together and having operated a suitable clutch (not shown) to thereby deliver power to the respective shafts, it will be seen that power will be transmitted from the power plant through the driving gear pinion 48, beveled gear 40 and driven beveled gear pinion 59 to the driven shaft 58 and to the pump 60 for operating the hoist 18 to raise the dump body 16 from horizontal to dumping position. When it is desired to lower the dumping body 16 from dumping position to horizontal position, a valve 61 may be operated to relieve the pressure back of the piston 19, thus permitting the body to lower as is well understood by those in the art. As stated above, the hoist forms no specific part of my invention as there are various designs of hoists on the market which may be readily used therewith and I have, therefore, not illustrated the detailed constructions of such hoists as my invention is concerned primarily with the transmission of power from the power source to the hoist.

While I have shown one specific embodiment of my invention, it will be understood to those skilled in the art that various modifications may be made therein and, therefore, I do not desire to limit my invention to the exact details shown and described but on the contrary my invention is to be limited only by the scope of the subjoined claims.

What I claim is:

1. In combination with a truck, a trailer, and a fifth wheel and king pin for joining said truck and trailer, of power driving means comprising, a gear rotatable on said king pin, a drive shaft having a gear thereon for driving said first gear, a support on said trailer for said drive shaft, a stud on said support engageable with said fifth wheel maintaining said shaft in axial alignment with said truck, and means driven by said first gear.

2. The combination with a truck, a trailer, and a coupling device comprising a fifth wheel and a king pin coupling said truck and trailer, of power transmitting mechanism comprising, a drive shaft having a gear thereon supported by said trailer, means carried by said trailer engageable with said fifth wheel for maintaining said shaft in axial alignment with said truck, a gear journaled on said king pin meshing with said first gear, a driven shaft, and a gear on said driven shaft meshing with said second gear whereby power is transmitted from said drive shaft to said driven shaft.

3. In combination with a truck, a trailer, and a coupling device comprising a fifth wheel having a slot therein and a king pin joining said truck and trailer, of power transmitting mechanism comprising, a member supported by said trailer rotatable about said king pin, a driving shaft having a gear thereon supported by said member, means carried by said member extending into said fifth wheel slot for maintaining said shaft in axial alignment with said truck, a gear journaled on said king pin meshing with said driving shaft gear, a driven shaft, and a gear on said driven shaft meshing with said second gear whereby power is transmitted from said driving shaft to said driven shaft.

4. In combination with a truck, a trailer, and a coupling device comprising a fifth wheel and king pin joining said truck and trailer, of power transmitting mechanism comprising, a member supported by said trailer rotatable about said king pin, a driving shaft having a gear thereon supported by said member, means on said member engageable with said fifth wheel to maintain said driving shaft in axial alignment with said truck and said member in alignment with said fifth wheel, a gear journaled on said king pin meshing with said driving gear, a driven shaft, and a gear thereon meshing with said second gear whereby power is transmitted from said drive shaft to said driven shaft.

5. In combination with a truck, a trailer, and a coupling means comprising a fifth wheel and king pine joining said truck and trailer, of power transmitting mechanism comprising, a member supported by said trailer rotatable about said king pin, a driving shaft having a gear thereon supported by said member, means on said member movable in an arc radiating from the axis of said king pin and engageable with said fifth wheel for maintaining said driving shaft in axial alignment with said truck, a gear journaled on said king pin meshing with said driving gear, a driven shaft, and a gear thereon meshing with said second gear whereby power is transmitted from said driving shaft to said driven shaft.

6. In combination with a truck, a trailer, and a coupling device comprising a fifth wheel and a king pin joining said truck and trailer, of a driving shaft having a gear thereon supported by said trailer, a driven gear journaled on said king pin above said fifth wheel, a driven shaft having a gear thereon for transmitting power from said driving shaft, and means supported by said trailer engageable with said fifth wheel maintaining said driving shaft in axial alignment with the longitudinal axis of said truck.

7. In combination with a truck, a trailer, and a coupling device comprising a fifth wheel and a king pin joining said truck and trailer, of power transmitting mechanism comprising, a member supported by said trailer rotatable about said king pin, means extending from said member engageable with said fifth wheel for maintaining said member in a predetermined position relative to said truck, a driving shaft having a gear thereon supported by said member, a gear journaled on said king pin meshing with said driving gear, a driven shaft, and a gear thereon meshing with said second gear.

8. In combination with a truck, a trailer, and a coupling device comprising a fifth wheel having a rearwardly facing slot therein and a king pin adapted to be locked in said slot, of power transmitting mechanism comprising, power means on said truck, driving means driven by said power means having a train of gears each supported by said trailer, and means supported by said trailer extended into said slot engageable with said fifth wheel maintaining the longitudinal axis of the driving gear of said train of gears in axial alignment with said truck.

9. In combination with a truck, a trailer, a fifth wheel pivotally mounted on said truck, and a king pin on said trailer engageable with said fifth wheel for joining said truck and trailer, of power means on said truck, and driving means driven by said power means comprising, a train of gears each supported by said trailer above said fifth wheel, and means supported by said trailer engageable with said fifth wheel maintaining the longitudinal axis of the driving gear of said train of gears in axial alignment with said truck.

10. In combination with a truck, a trailer, a fifth wheel pivotally supported by said truck, and a king pin fixed on said trailer adapted to engage said fifth wheel to join said truck and trailer, of power means on said truck, a driven member supported by said trailer, and driving means between said power means and driven member comprising, a gear journaled on said king pin, a gear on said driven member rotated by said first gear, a third gear operatively connected with said power means engageable with said first gear for rotating the same, and means supported by said trailer engageable with said fifth wheel maintaining the longitudinal axis of said third gear in axial alignment with said truck.

11. In combination with a truck, a trailer, a fifth wheel supported by said truck, and a king pin fixed on said trailer adapted to be locked in said fifth wheel for joining said truck and trailer, of power means on said truck, and power transmission means supported by said trailer for transmitting power from said power means to a driven member comprising, a gear journaled on said king pin above said fifth wheel, a gear on said driven member meshing with said first gear, a member supported by said trailer rotatable about said king pin, and a gear supported by said rotatable member meshing with said first gear operatively connected with said power means, said last gear being rotatable about its axis and rotatable bodily with said rotatable member about an arc radiating from said king pin whereby the longitudinal axis thereof is maintained in axial alignment with said truck irrespective of whether the longitudinal axes of said truck and trailer are in alignment.

12. In combination with a truck, a trailer supported thereby, a fifth wheel pivotally supported by said truck, and a king pin fixed on said trailer engageable with said fifth wheel for joining said truck and trailer, of power driving means comprising, a shaft having a gear thereon, a member supported by said trailer supporting said shaft, means on said member engageable with said fifth wheel for maintaining said shaft in axial alignment with said truck, a gear driven by said first gear rotatably mounted on said king pin, and a shaft having a gear thereon driven by said second gear whereby power is transmitted from said power driving means to said last named shaft.

JOHN S. EDWARDS.